: US 11,520,295 B2
(45) Date of Patent: Dec. 6, 2022

(12) United States Patent
Baba

(54) WATCH HAVING A PROTECTIVE LAYER COVERING A POWER GENERATING UNIT AND AN ANTENNA

(71) Applicant: Seiko Epson Corporation, Tokyo (JP)

(72) Inventor: Norimitsu Baba, Shiojiri (JP)

(73) Assignee: SEIKO EPSON CORPORATION ( * ) Notice: Subject to any disclaimer, the term of this patent is extended or adjusted under 35 U.S.C. 154(b) by 292 days.

(21) Appl. No.: 16/904,633

(22) Filed: Jun. 18, 2020

(65) Prior Publication Data
US 2020/0401085 A1 Dec. 24, 2020

(30) Foreign Application Priority Data
Jun. 19, 2019 (JP) .............................. JP2019-113537

(51) Int. Cl.
G04C 10/02 (2006.01)
G04R 20/02 (2013.01)
G04B 37/00 (2006.01)
G04R 60/10 (2013.01)
G04B 19/247 (2006.01)
G04B 19/22 (2006.01)

(52) U.S. Cl.
CPC ......... G04C 10/02 (2013.01); G04B 37/0008 (2013.01); G04R 20/02 (2013.01); G04R 60/10 (2013.01); G04B 19/223 (2013.01); G04B 19/247 (2013.01)

(58) Field of Classification Search
CPC ........ G04R 20/02; G04R 60/12; G04R 60/10; G04B 19/223; G04B 37/0008; G04B 19/24; G04C 10/02
See application file for complete search history.

(56) References Cited

U.S. PATENT DOCUMENTS

| 8,804,465 B2 * | 8/2014 | Fujisawa | G04R 20/02 368/14 |
| 9,823,625 B2 * | 11/2017 | Abe | G04C 10/02 |
| 11,221,591 B2 * | 1/2022 | Nakajima | G04G 17/06 |
| 11,231,688 B2 * | 1/2022 | Yamamoto | G04C 10/02 |

FOREIGN PATENT DOCUMENTS

| JP | 2012-107955 A | 6/2012 |
| JP | 2013-205333 A | 10/2013 |
| JP | 2018-017548 A | 2/2018 |

* cited by examiner

Primary Examiner — Edwin A. Leon
(74) Attorney, Agent, or Firm — Harness, Dickey & Pierce, P.L.C.

(57) ABSTRACT

A watch includes a case, and a solar cell disposed inside the case and including a substrate made of resin and having a surface, a power generating unit having, at the surface, a first electrode, a first semiconductor layer, and a second electrode that are stacked in order, a first antenna including a third electrode that is provided at the surface and that is disposed at a position not to overlap the power generating unit in a plan view viewed in a direction orthogonal to the surface, and a protective layer disposed covering the power generating unit and the first antenna.

9 Claims, 19 Drawing Sheets

WATCH HAVING A PROTECTIVE LAYER COVERING A POWER GENERATING UNIT AND AN ANTENNA

The present application is based on, and claims priority from JP Application Serial Number 2019-113537, filed Jun. 19, 2019, the disclosure of which is hereby incorporated by reference herein in its entirety.

BACKGROUND

1. Technical Field

The present disclosure relates to a watch.

2. Related Art

JP-A-2013-205333 discloses a watch that includes a solar cell and a support that secures the solar cell. The watch in JP-A-2013-205333 is configured to wirelessly communicate with an external device by using the support as a planar antenna.

However, in JP-A-2013-205333, the solar cell and the support that constitute the planar antenna are configured as separate parts. As a result, there is a problem in that the number of parts increases and assembly becomes complicated.

SUMMARY

A watch according to the present disclosure includes a case, and a solar cell disposed inside the case and including a substrate made of resin and having a surface, a power generating unit having, at the surface, a first electrode, a first semiconductor layer, and a second electrode stacked in order, a first antenna including a third electrode, provided at the surface and disposed at a position so as not to overlap the power generating unit in a plan view viewed in a direction orthogonal to the surface, and a protective layer disposed covering the power generating unit and the first antenna.

In the watch according to the present disclosure, the first electrode and the third electrode may be disposed to at least partially overlap in a side view viewed in a direction parallel to the surface.

In the watch according to the present disclosure, a second semiconductor layer may be disposed between the third electrode and the protective layer.

In the watch according to the present disclosure, the first semiconductor layer and the second semiconductor layer may be provided integrally.

In the watch according to the present disclosure, a resin layer may be provided between the second semiconductor layer and the protective layer.

In the watch according to the present disclosure, the watch may further include a dial, and a dial ring disposed at a periphery of the dial in plan view, and the third electrode may be disposed at a position to overlap the dial ring in the plan view.

In the watch according to the present disclosure, the solar cell may further include a second antenna including a fourth electrode, provided at the surface and disposed at a position so as not not to overlap the power generating unit and the third electrode in the plan view, and the protective layer may be disposed covering the power generating unit, the first antenna, and the second antenna.

In the watch according to the present disclosure, the first antenna may be disposed between the power generating unit and the case in the plan view.

In the watch according to the present disclosure, the case may be formed of a metal.

DESCRIPTION OF EXEMPLARY EMBODIMENTS

First Embodiment

A watch 1 according to a first embodiment of the present disclosure will be described below with reference to the drawings.

Figure 1:
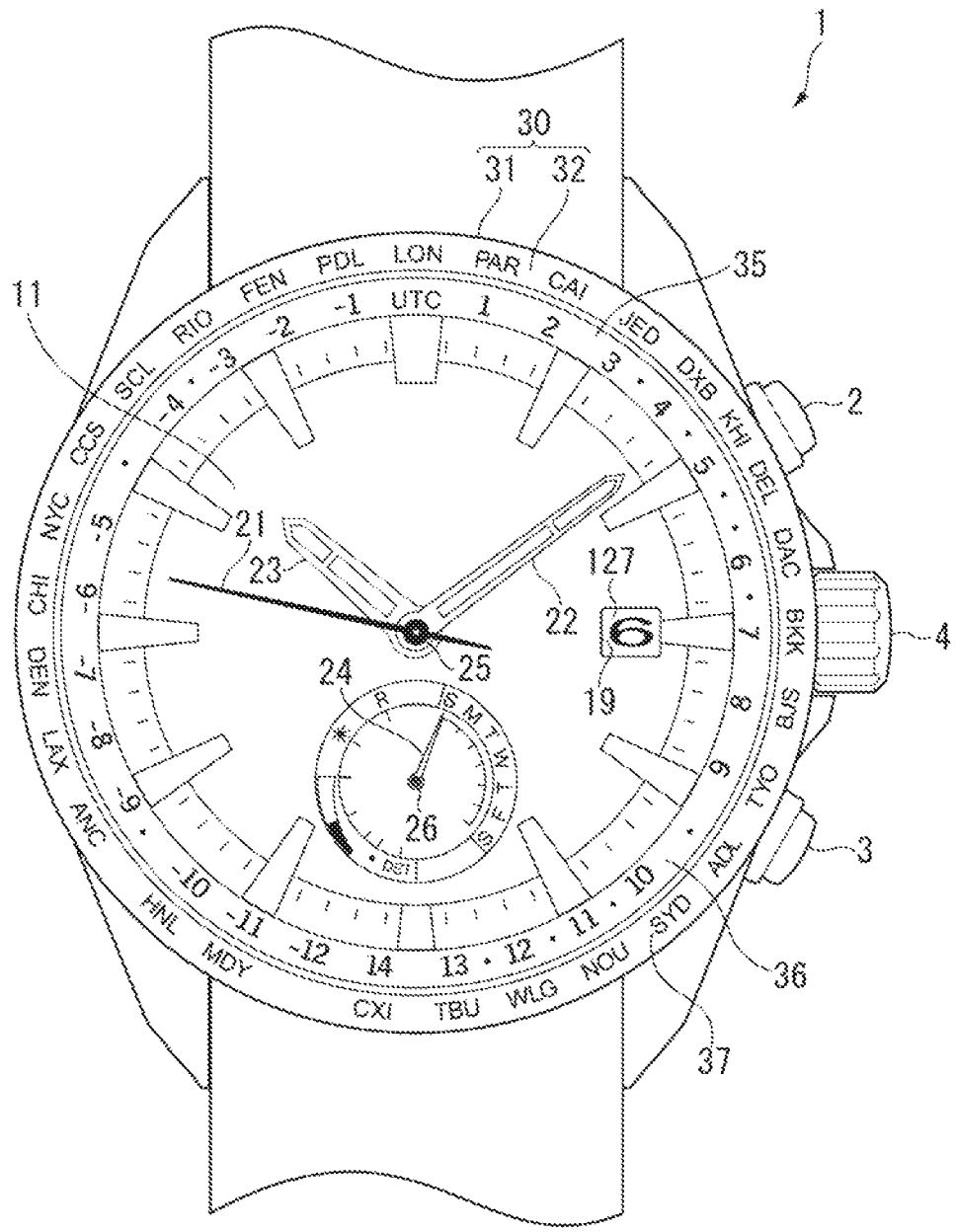
FIG. 1 is a front view schematically illustrating a clock according to a first embodiment.
Figure 2:
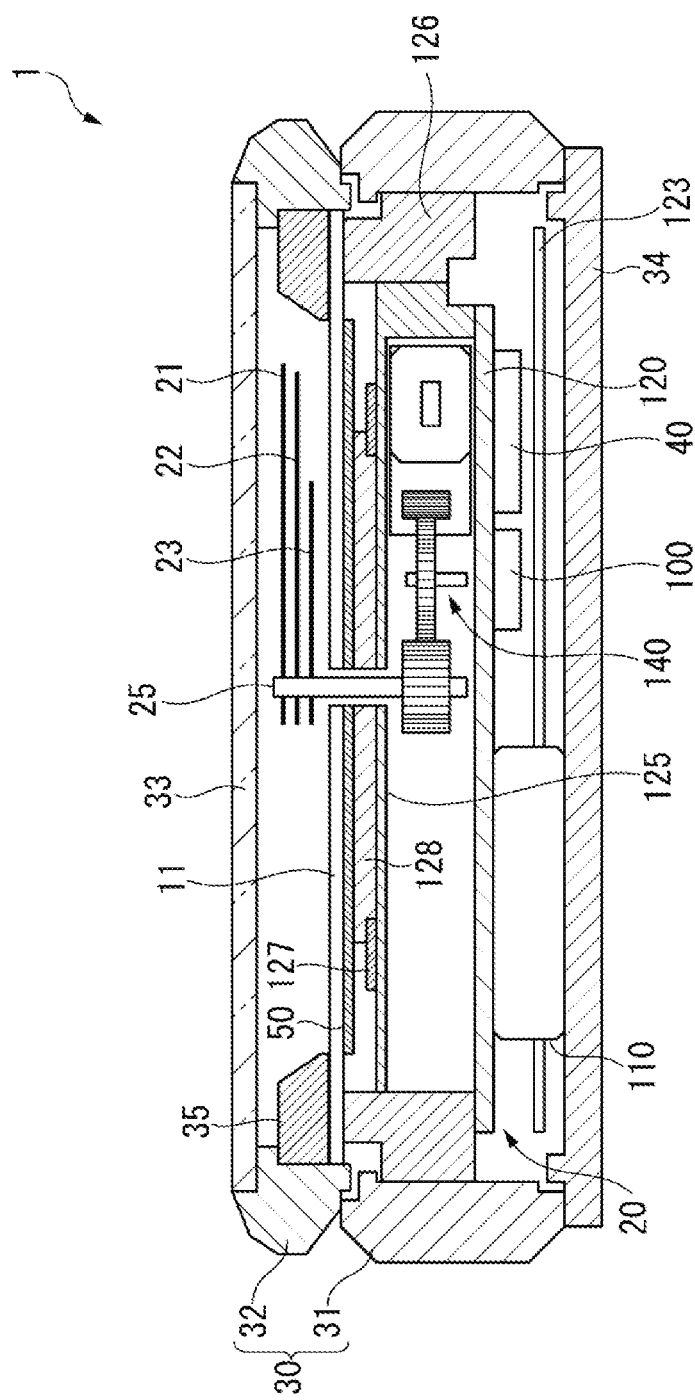
FIG. 2 is a cross-sectional view schematically illustrating the clock according to the first embodiment.

FIG. 1 is a front view schematically illustrating the watch 1, and FIG. 2 is a cross-sectional view schematically illustrating the watch 1. In the present embodiment, the watch 1 is configured as an analog electronic watch.

As illustrated in FIGS. 1 and 2, the watch 1 includes an outer case 30, a crystal 33, and a case back 34. The outer case 30 is formed by fitting a bezel 32 into a cylindrical case 31 made of metal. The bezel 32 may be made of metal or ceramic. A dial ring 35 having a ring shape and formed of a non-electrically conductive resin and a dial 11 having a disc shape and formed of a non-conductive member such as polycarbonate are disposed inward of the periphery of the bezel 32 and serve as a time indication portion.

On a side surface of the outer case 30, an A button 2 is disposed at a 2 o'watch position, a B button 3 is disposed at a 4 o'watch position, and a crown 4 is disposed at a 3 o'watch position from the planar center of the dial 11.

Of two openings in the case 31, an opening closer to the front of the watch 1 is covered by the crystal 33 via the bezel 32, and an opening closer to the rear of the watch 1 is covered by the case back 34 made of metal. Note that in the present embodiment, the side of the case 31 covered by the crystal 33 is referred to as a front side of the watch 1, and the side covered by the case back 34 is referred to as a rear side of the watch 1.

The dial ring 35 attached to the inner circumference of the bezel 32, the dial 11, a movement 20, a solar cell 50, and a secondary battery 110 are disposed inside the outer case 30.

An outer peripheral end of the dial ring 35 is in contact with an inner circumferential surface of the bezel 32. The dial ring 35 includes a flat plate portion that is parallel with the crystal 33, and an inclined portion that is inclined toward the dial 11.

The dial 11 is a circular plate member that displays time inside the case 31, and is formed of a light-transmitting material such as a resin, which is a non-electrically conductive material. The dial 11 includes hands 21 to 24 and other components disposed between the dial 11 and the crystal 33 and is disposed further rearward than the dial ring 35.

A dial support ring 126 that holds the dial 11 is provided on the rear side of the dial 11. The dial support ring 126 is formed of a resin and has a ring shape that follows the inner circumferential surface of the case 31. The solar cell 50 is disposed inward of the inner circumferential surface of the dial support ring 126.

Watch Display Features

As illustrated in FIG. 1, the dial ring 35 surrounding the outer peripheral portion of the dial 11 includes marks that divide the inner circumference into 60 divisions. Using these marks, the hand 21 typically indicates "seconds", the hand 22 indicates "minutes", and the hand 23 indicates "hours".

The hand 24 is attached to a hand shaft 26 provided at a 6 o'watch position from the planar center of the dial 11. A power indicator indicating the amount of remaining battery charge, an "R" mark indicating that radio waves are being received, the first letters of alphanumeric words indicating days of the week, and other features are displayed outside of the rotation region of the hand 24 in the dial 11. The hand 24 displays information such as remaining battery charge, day of the week, reception of radio waves, and other information by pointing to these features. Note that the hand 24 typically displays the day of the week.

A calendar window 19 is provided in an opening portion in which the dial 11 is open in a rectangular shape. A number displayed in a date indicator 127 is visible through the opening portion. This number represents the "day" of a date.

In the dial ring 35, a time difference information 36 indicating time difference with Coordinated Universal Time is displayed as numbers and non-numerical symbols along the marks on the inner circumferential side of the dial ring 35. Time difference information 36 in the form of a number is an integer time difference, and time difference information 36 in the form of a symbol is a non-integer time difference. The time difference between the time indicated by the hands 21 to 23 and Coordinated Universal Time can be confirmed using the time difference information 36 indicated by the hand 21 by pressing the B button 3.

In the bezel 32, which is provided around the dial ring 35, city information 37 indicating representative city names of time zones based on Standard Time corresponding to the time difference in the time difference information 36 indicated in the dial ring 35 is displayed together with the time difference information 36. Here, display of the time difference information 36 and the city information 37 is referred to as a time zone display. In this embodiment, the time zone display is equal to the number of time zones used across the world. Note that the city names illustrated in FIG. 1 are exemplary and may be changed as appropriate in accordance with changes in the time zone.

Movement

Figure 3:
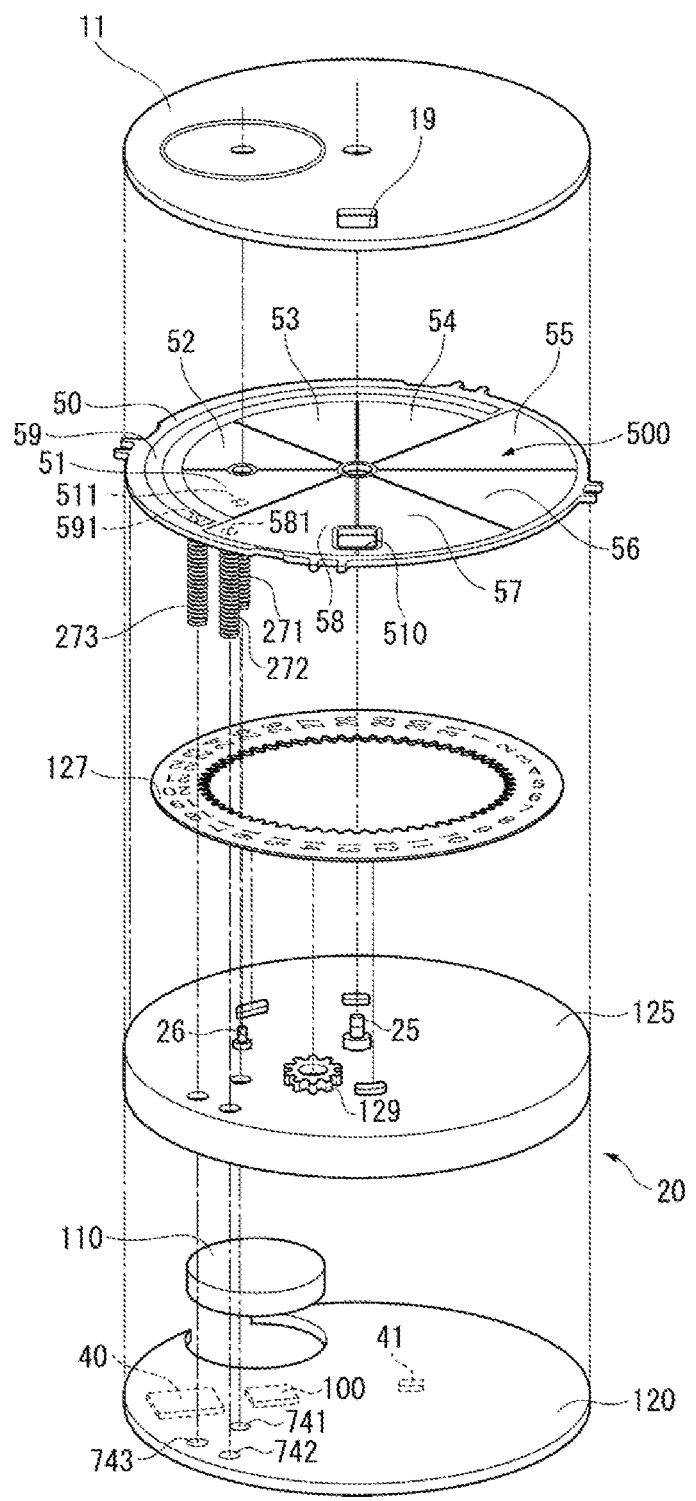
FIG. 3 is an exploded perspective view schematically illustrating a movement in the watch according to the first embodiment.

FIG. 3 is an exploded perspective view schematically illustrating the movement 20.

As illustrated in FIGS. 2 and 3, the movement 20 includes the hands 21, 22, 23, and 24, the hand shaft 25 to which the hands 21 to 23 are mounted, the hand shaft 26 to which the hand 24 is mounted, a printed wired board 120, a main plate 125, the date indicator 127, a date indicator maintaining plate 128, a drive mechanism 140 for driving the hands 21 to 24, and other components.

The hand shaft 25 is provided along a central axis extending in front and rear directions through the planar center of the outer case 30. The guide shaft 26 is provided along the central axis passing through a position shifted to a 6 o'watch position from the center.

The date indicator 127 and the date indicator maintaining plate 128 that holds the date indicator 127 are provided between the main plate 125 and the solar cell 50. The date indicator 127 and the date indicator maintaining plate 128 are formed of a non-electrically conductive resin. The main plate 125 is provided with a date indicator driving wheel 129 that rotates the date indicator 27.

The dial 11, the solar cell 50, the date indicator maintaining plate 128, and the main plate 125 are formed with holes through which the hand shafts 25 and 26 pass. The main plate 125 is formed with through holes, and solar cell conduction springs 271, 272 and an antenna conduction spring 273 to be described below penetrate the through holes.

The main plate 125 is formed of a non-electrically conductive resin and has an attachment portion for a drive mechanism 140.

The drive mechanism 140 is attached to the main plate 125. The drive mechanism 140 includes a step motor and a train wheel such as a gear, and the step motor rotates the hand shafts 25, 26 via the train wheel to drive the hands 21 to 24.

A reception device 40, a matching circuit 41, and a control device 100 are provided on the printed wired board 120. The printed wired board 120 is provided with charging terminals 741, 742 to which the solar cell conduction springs 271, 272 to be described below are connected, and a connection terminal 743 to which the antenna conduction spring 273 is connected. In the present embodiment, the connection terminal 743 is provided in the vicinity of the reception device 40.

Further, the printed wired board 120 is connected to a secondary battery 110 such as a lithium-ion battery that is charged by power generated by the solar cell 50. A circuit maintaining plate 123 is disposed on the rear side of the printed wired board 120.

The solar cell 50 is formed into a disc shape and is configured of eight solar cells 51 to 58 and a first antenna 59.

An opening portion 510 corresponding to the calendar window 19 is formed in the solar cell 50. The solar cell 50 is described in detail later.

The first antenna 59 is configured as a so-called monopole antenna. Details of the first antenna 59 will be described below.

Watch Circuit Configuration

Figure 4:
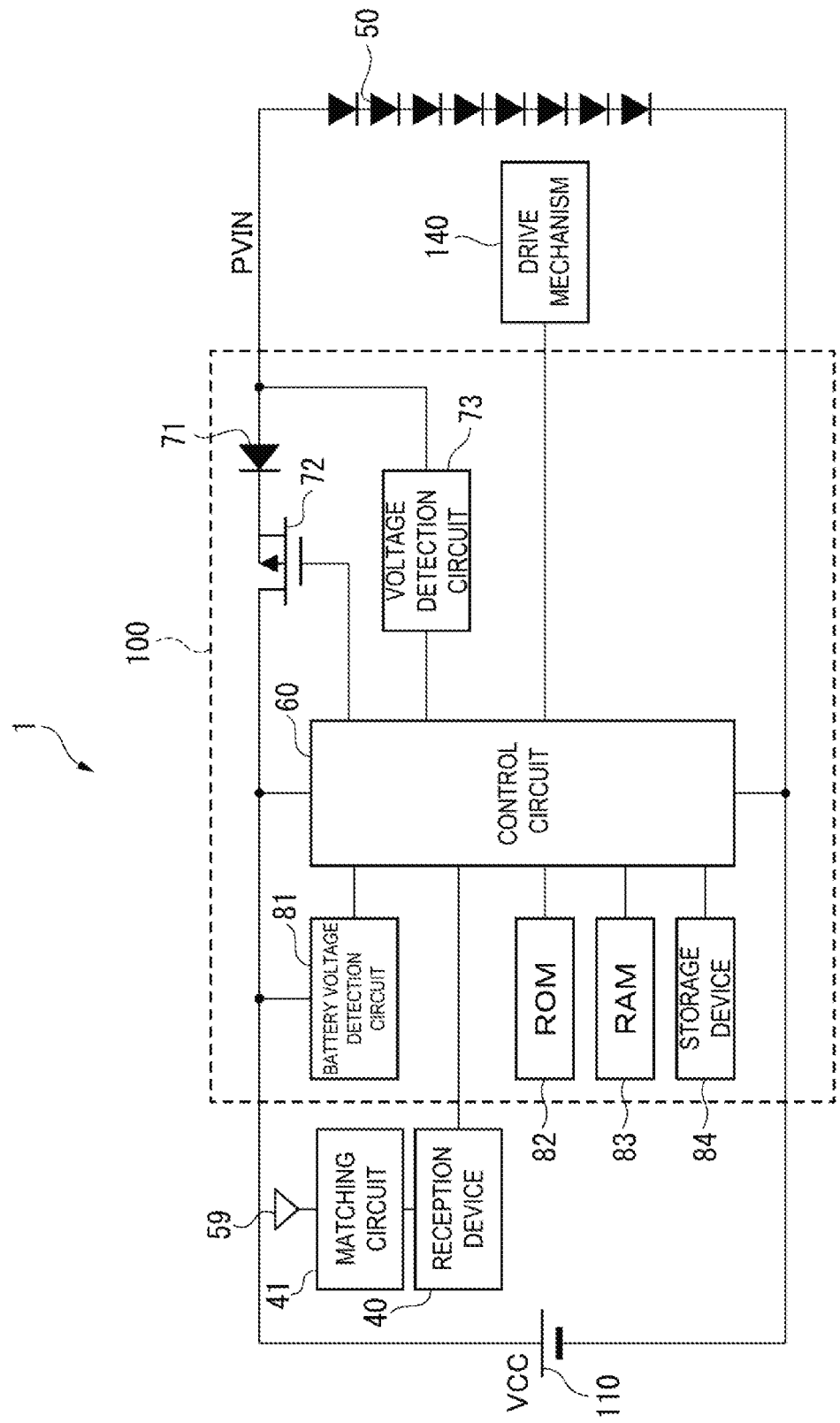
FIG. 4 is a block diagram illustrating a schematic configuration of the watch according to the first embodiment.

FIG. 4 is a diagram illustrating the circuit configuration of the watch 1.

As illustrated in FIG. 4, the watch 1 includes the control device 100, the reception device 40, the matching circuit 41, the solar cell 50, and the first antenna 59.

The control device 100 includes a control circuit 60, a battery voltage detection circuit 81, a ROM 82, a RAM 83, a storage device 84, a diode 71, a charging control switch 72, and a voltage detection circuit 73.

The battery voltage detection circuit 81 detects the battery voltage of the secondary battery 110 at, for example, 5 to 10 second intervals, and outputs the detected value to the control circuit 60.

The ROM 82 stores programs to be executed by the control circuit 60 and data used when executing the programs. Note that ROM is an abbreviation of "read-only memory".

The RAM 83 stores rewritable data such as internal time data and display time data. Note that RAM is an abbreviation of "random access memory".

The storage device 84 is configured of a rewritable, nonvolatile memory. Examples of a nonvolatile memory include an EEPROM and a flash memory. Note that EEPROM is an abbreviation of "electrically erasable programmable read-only memory". The storage device 84 may be externally attached to the control device 100. Local time setting data, summertime reference data, and the like are stored in the storage device 84.

The control circuit 60 controls drive of the drive mechanism 140 by executing the various programs stored in the ROM 82.

The diode 71 is provided on a path that electrically connects the solar cell 50 and the secondary battery 110 to interrupt reverse current from the secondary battery 110 to the solar cell 50 without blocking forward current from the solar cell 50 to the secondary battery 110. Note that flow of the forward current is limited when the voltage of the solar cell 50 is higher than the voltage of the secondary battery 110, that is, when charging. The diode 71 prevents current from flowing from the secondary battery 110 to the solar cell 50 if the voltage of the solar cell 50 is lower than that of the secondary battery 110.

The charging control switch 72 connects and disconnects the path of current from the solar cell 50 to the secondary battery 110, and includes a switching element provided on the path that electrically connects the solar cell 50 and the secondary battery 110. The path of current is connected when the switching element transitions from the off state to the on state, and disconnected when the switching element transitions from the on state to the off state.

The reception device 40 is connected to the first antenna 59 via the matching circuit 41, and is configured to communicate radio waves for short-range wireless communication, such as Bluetooth (registered trademark), received by the first antenna 59.

The matching circuit 41 includes a capacitor, an inductor, and other components, and matches impedance between the first antenna 59 and the reception device 40.

Solar Cell

Figure 5:
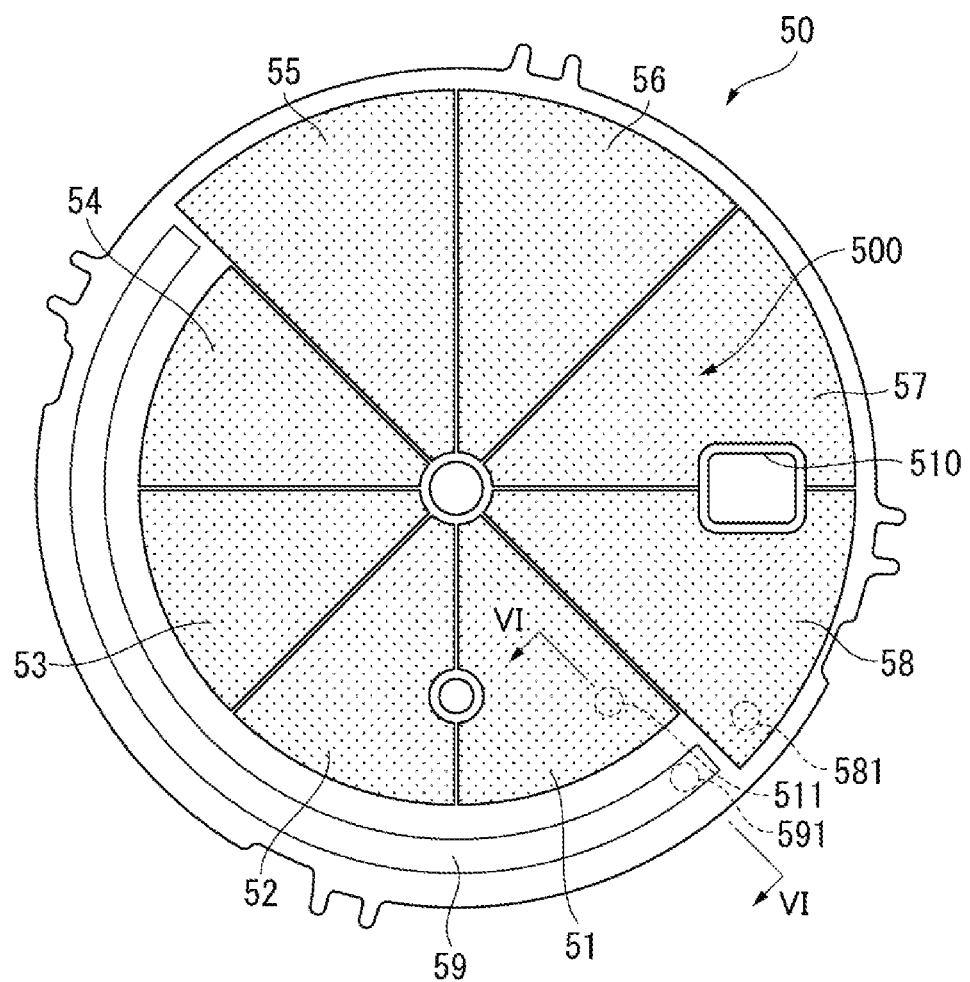
FIG. 5 is a plan view schematically illustrating a solar cell in the watch according to the first embodiment.

FIG. 5 is a plan view schematically illustrating the solar cell 50.

As illustrated in FIGS. 3 and 5, the solar cells 51 to 58 of the solar cell 50 each have a substantially fan-like shape surrounded by two lines extending radially from the planar center of the solar cell 50 and a line along the outer periphery of the solar cell 50. Note that the solar cells 51 to 58 are an example of a power generating unit watch according to the present disclosure.

In the present embodiment, the solar cells 55 to 58 in which the first antenna 59 is not disposed on the outer circumferential side are formed so as to have a larger area than that of the solar cells 51 to 54 in which the first antenna 59 is disposed on the outer circumferential side. As a result, the area of the power generating unit can be increased, and the amount of incident light can be increased. Note that the configuration is not limited to that described above, and, for example, a configuration may be adopted in which the area of each solar cell 51 to 58 is made uniform by adjusting the center angle of each solar cell 51 to 58 formed into a substantially fan-like shape. Specifically, the area of each solar cell 51 to 58 may be made uniform by increasing the central angle of each solar cell 51 to 54 in which the first antenna 59 is disposed on the outer circumferential side and reducing the center angle of each solar cell 55 to 58 in which the first antenna 59 is not disposed on the outer circumferential side.

Adjacent cells among the solar cells 51 to 58 are connected to each other by a connecting portion (not shown). Thus, the solar cells 51 to 58 are connected in series. The solar cells 51, 58 located at the end of the electrical connection are provided with a solar cell connection terminal 511, 581, respectively, formed of silver paste, a material made by mixing silver paste and carbon, or the like.

The solar cell connection terminal 511 is electrically connected to a first electrode 502 to be described later, and the solar cell connection terminal 581 is electrically connected to a second electrode 504 to be described later. The solar cell conduction springs 271, 272 are disposed between the solar cell connection terminals 511, 581 and the charging terminals 741, 742 of the printed wired board 120, respectively. Thus, power generated by the solar cells 51 to 58 is charged to the secondary battery 110 via the solar cell connection terminals 511, 581, the solar cell conduction springs 271, 272, and the charging terminals 741, 742.

The first antenna 59 is formed in an arched band shape and is disposed on the outer circumferential side of the solar cells 51 to 54. In other words, the first antenna 59 is disposed between the solar cells 51 to 54 constituting the power generating unit watch and the case 31 at a position avoiding interference with the A button 2, the B button 3, and the crown 4 when viewed from the front. An antenna connection terminal 591 that is electrically connected to a third electrode 505 to be described later is provided on one end portion of the first antenna 59. In the present embodiment, the antenna connection terminal 591 is formed of silver paste, a material made by mixing silver paste and carbon, or the like. Note that in the present embodiment, the first antenna 59 is formed to have a width thicker than the diameter of the antenna connection terminal 591. As a result, the mechanical strength of the first antenna 59 can be increased, impedance can be prevented from increasing, and reception sensitivity can be prevented from decreasing.

An antenna conduction spring 273 is provided between the antenna connection terminal 591 and the connection terminal 743 provided on the printed wired board 120. As a result, the first antenna 59 is configured as a monopole antenna. Further, as described above, the first antenna 59 is configured to receive radio waves for short-range wireless communication, such as Bluetooth (registered trademark).

Figure 6:
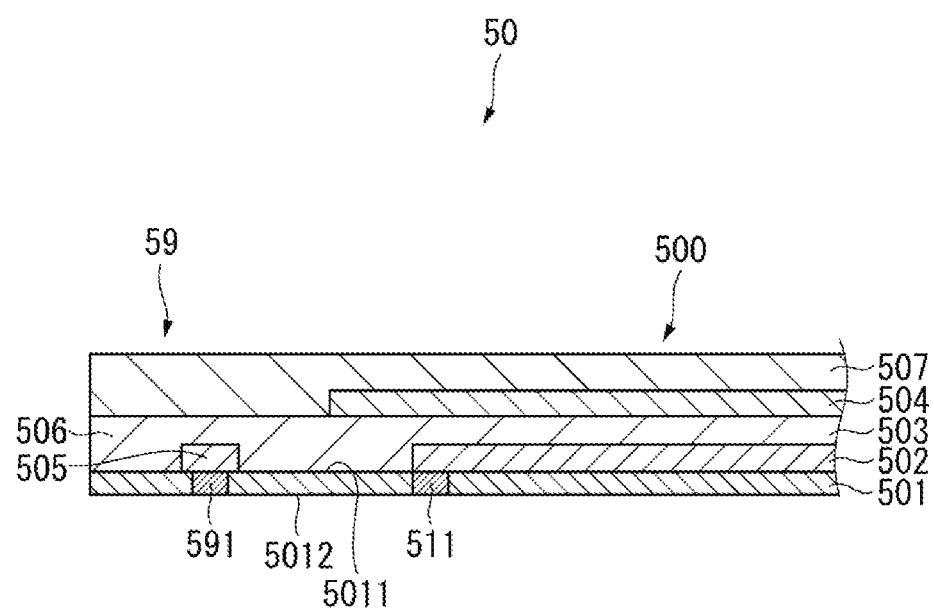
FIG. 6 is a cross-sectional view schematically illustrating the solar cell in the watch according to the first embodiment.

FIG. 6 is a cross-sectional view taken along the line VI-VI in FIG. 5.

As illustrated in FIG. 6, the solar cell 50 includes a substrate 501, the first electrode 502, a first semiconductor layer 503, the second electrode 504, the third electrode 505, a second semiconductor layer 506, and a protective layer 507.

Substrate

The substrate 501 is made of resin and is formed of a resin film such as polyethylene or polyimide. The surface of the substrate 501 closer to the dial 11, that is, the upper surface illustrated in FIG. 6 is a surface 5011. The surface of the substrate 501 opposite to the surface 5011 is a rear surface 5012.

The solar cell connection terminal 511, 581 and the antenna connection terminal 591 described above are provided on the substrate 501.

Note that in the present embodiment, the view from a direction orthogonal to the surface 5011 is referred to as a plan view, and the view from a direction parallel to the surface 5011 is referred to as a side view.

First Electrode

The first electrode 502 is formed of a conductive body containing a metal material such as aluminum or stainless steel, and is stacked at the surface 5011 of the substrate 501. The first electrode 502 is selectively formed at a position corresponding to the solar cells 51 to 58 described above.

As described above, the solar cell connection terminal 511 is electrically connected to the first electrode 502.

First Semiconductor Layer

The first semiconductor layer 503 is formed so that a p-type semiconductor and an n-type semiconductor sandwich an i-type semiconductor, and is stacked on the first electrode 502 described above. Pure silicon, which is used as the semiconductor material, is an insulator. Adding impurities to the silicon decreases the resistivity of the silicon and creates p-type semiconductors and n-type semiconductors. For example, a p-type semiconductor is obtained by adding boron, which is an impurity in silicon. An n-type semiconductor is obtained by adding phosphorus and arsenic, which are impurities in silicon. An i-type semiconductor is an intrinsic semiconductor in which no impurities are added to the silicon. Each semiconductor has a random array of atoms, that is, is amorphous. By making each semiconductor amorphous, it is possible to generate power even with thin films because more light can be absorbed. Further, each semiconductor is formed by adding hydrogen or the like to improve power generation performance. This kind of semiconductor is formed using, for example, a plasma CVD method.

Second Electrode

The second electrode 504 is a so-called transparent electrode formed of a conductive body including zinc oxide, indium oxide, tin oxide, or the like, and is stacked on the first semiconductor layer 503 described above. One example of a typical material is indium tin oxide.

Similar to the first electrode 502 described above, the second electrode 504 is selectively formed at a position corresponding to the solar cells 51 to 58.

When light transmitted through the second electrode 504 is incident on the first semiconductor layer 503, which is a photoelectric conversion layer, electrons and holes are generated in the i-semiconductor due to the energy of the light. The generated electrons and holes move in the direction of the p-type semiconductor and the n-type semiconductor, respectively. As a result, current flows through the solar cell connection terminal 511 connected to the first electrode 502, the solar cell connection terminal 581 connected to the second electrode 504, the solar cell conduction springs 271, 272, and the charging terminals 741, 742 to reach the secondary battery 110. Thus, photovoltaic power is generated. In other words, the first electrode 502, the first semiconductor layer 503, and the second electrode 504 stacked at the surface 5011 of the substrate 501 in that order constitute the power generating unit watch according to the present disclosure.

Third Electrode

In plan view, the third electrode 505 is stacked at the surface 5011 of the substrate 501 at a position not overlapping with the first electrode 502 that constitutes the power generating unit watch.

The third electrode 505 is formed of a conductive body containing a metal material such as aluminum or stainless steel. In the present embodiment, the third electrode 505 is formed by, for example, sputtering or machining and is disposed at a position overlapping with the first electrode 502 in side view.

Further, the third electrode 505 is selectively formed at a position corresponding to the first antenna 59 described above. As a result, the third electrode 505 constitutes the first antenna 59.

Second Semiconductor Layer

The second semiconductor layer 506 is disposed between the third electrode 505 and the protective layer 507. Similar to the first semiconductor layer 503 described above, the second semiconductor layer 506 is formed such that a p-type semiconductor and an n-type semiconductor sandwich an i type semiconductor. In the present embodiment, the second semiconductor layer 506 is integrally formed with the first semiconductor layer 503.

Here, the second semiconductor layer 506 has low conductivity. For example, in the second semiconductor layer 506, the conductivity of the i-type semiconductor, which is the thickest semiconductor, is $10^{-2}$ S/cm or less. Therefore, the second semiconductor layer 506 has sufficient radio wave transmittance.

Note that the configuration of the second semiconductor layer 506 is not limited to that described above, and the first semiconductor layer 503 and the second semiconductor layer 506 may be provided separately.

Protective Layer

The protective layer 507 is formed of a non-conductive resin having excellent strength and is stacked on the second electrode 504 and the second semiconductor layer 506. In other words, the protective layer 507 is disposed covering the power generating unit watch and the first antenna 59. With this configuration, the power generating unit watch and the first antenna 59 are protected by the protective layer 507. Additionally, because the protective layer 507 is non-conductive, there is little effect on the reception sensitivity of the first antenna 59.

Further, the protective layer 507 is preferably formed of a colorless transparent resin having high light transmittance in order to increase the amount of light incident on the solar cell 50.

Examples of such resins include polyethylene resins, acrylic resins, and polyester resins. Note that the protective layer 507 may be formed of a plurality of layers made of one or more materials.

Furthermore, when light is reflected at the surface of the protective layer 507, that light does not reach the first semiconductor layer 503. Thus, the surface of the protective layer 507 may be subjected to a non-reflective treatment so as to suppress reflection as much as possible.

Reception Characteristics of Radio Waves

In the present embodiment, the case 31 and the case 34 are made of metal and thus have high electrical conductivity. As a result, the case 31 and the case back 34 have low radio wave transmittance and few radio waves for short-range wireless communication propagate through the case 31 and the case back 34. Therefore, the majority of radio waves that reach the first antenna 59 are propagated from the front side of the watch 1.

In the present embodiment, the first antenna 59 is provided in the solar cell 50 disposed on the rear side of the dial 11. Thus, it is possible to increase the reception sensitivity of radio waves over a case where, for example, a patch antenna or the like is provided on the rear side of the solar cell 50 because the first antenna 59 is disposed near the dial 11 and few members are disposed in the propagation path of the radio waves.

Further, as described above, because the second semiconductor layer 506 has sufficient radio wave transmission properties in the present embodiment, it is possible to suppress attenuation of the radio waves propagated from the front side of the watch 1 when transmitting through the second semiconductor layer 506. Therefore, even if the second semiconductor layer 506 is stacked on the third electrode 505, the third electrode 505 is not hindered from receiving signals.

Further, in the present embodiment, the first antenna 59 is disposed between the solar cells 51 to 54 and the case 31, that is, along the outer circumferential edge of the solar cell 50. Thus, the area in which the first antenna 59 overlaps with the hands 21 to 23 in plan view is small. Therefore, even if the hands 21 to 23 are made of metal, the third electrode 505 is not hindered from receiving signals. However, the hands 21 to 23 are preferably non-conductive members so as to more effectively prevent signals from being blocked.

Color of Dial

In the present embodiment, the first semiconductor layer 503 is formed of silicon and thus has a color such as dark blue, blue violet, or dark gray. With this configuration, the color of the first semiconductor layer 503 is visible through the dial 11, the protective layer 507 and the second electrode 504 when the dial 11 is viewed from the front. Because of this, if the first semiconductor layer 503 is not provided at one portion, the color of that portion appears different to the color of the portion where the first semiconductor layer 503 is provided.

In this regard, in the present embodiment, the second semiconductor layer 506 is provided in the first antenna 59 in which the first semiconductor layer 503 is not provided. Thus, the difference in color between the power generating unit watch and the first antenna 59 can be reduced when viewing the dial 11 from the front.

Advantageous Effects of First Embodiment

According to the present embodiment, the following advantageous effects can be produced.

In the present embodiment, the watch 1 includes the solar cell 50 disposed inside the case 31. The solar cell 50 includes the power generating unit watch configured by stacking the first electrode 502, the first semiconductor layer 503 and the second electrode 504 in that order at the surface 5011 of the substrate 501. The solar cell 50 is disposed at the surface 5011 at a position in plan view that does not overlap with the solar cells 51 to 58 constituting the power generating unit watch, and includes the third electrode 505 that constitutes the first antenna 59.

With this configuration, the solar cells 51 to 58 constituting the power generating unit watch and the third electrode 505 constituting the first antenna 59 are integrally provided with the solar cell 50, and hence the number of parts can be reduced compared to a configuration in which the solar cell and the antenna are separately provided. Thus, the watch 1 can be assembled more easily.

In the present embodiment, the first electrode 502 and the third electrode 505 are disposed so as to overlap in side view. In other words, the first electrode 502 and the third electrode 505 are disposed at the same position with respect to the thickness direction of the watch 1. With this configuration, the thickness of the watch 1 can be reduced compared to a case where the first electrode 502 and the third electrode 505 are disposed at different positions relative to the thickness direction of the watch 1.

In the present embodiment, the second semiconductor layer 506 is disposed between the third electrode 505 and the protective layer 507. With this configuration, the difference in color between the region of the power generating unit watch and the region of the first antenna 59 can be reduced compared to a case where the first semiconductor layer 503 is provided only in the region of the power generating unit watch. Thus, when viewed from the front, the entire watch 1 appears to be same color without any color unevenness. As a result, appearance and decorative properties can be improved to achieve a more luxurious feel.

In the present embodiment, the first semiconductor layer 503 and the second semiconductor layer 506 are integrally provided. With this configuration, the solar cell 50 is more easily manufactured compared to a case where the first semiconductor layer 503 and the second semiconductor layer 506 are separately provided.

In the present embodiment, the first antenna 59 is disposed between the solar cells 51 to 54 constituting the power generating unit watch and the case 31 in plan view. That is, the first antenna 59 is disposed along the outer circumferential edge of the solar cell 50. With this configuration, the area in which the first antenna 59 overlaps with the hands 21 to 23 in plan view is small, and hence the effect on the reception of signals can be reduced even if the hands 21 to 23 are made of metal.

In the present embodiment, the case 31 is formed of a metal.

In this case, the majority of radio waves for near field communication are propagated to the case 31 from the front side of the watch 1. In the present embodiment, because the first antenna 59 is disposed in the solar cell 50 provided on the rear side of the dial 11, reception sensitivity of radio waves can be increased compared to a case where, for example, a patch antenna or the like is disposed on the rear side of the solar cell.

If a patch antenna or the like is disposed on the rear side of the solar cell, that is, if the solar cell and the antenna body are disposed overlapping in the propagation direction of the radio waves, there is a risk that the current flowing in the antenna body may leak into the solar cell and the reception sensitivity of the antenna body may decrease.

In contrast, in the present embodiment, the first antenna 59 and the solar cells 51 to 58 constituting the power generating unit watch are not disposed overlapping the propagation path of the radio waves, and thus a reduction in reception sensitivity due to a leakage of current can be suppressed.

Further, in the present embodiment, the connection terminal 743 connected to the antenna conduction spring 273 is provided in the vicinity of the reception device 40. Thus, wiring that connects the reception device 40 and the connection terminal 743 can be shortened. As a result, loss of current due to such wiring can be reduced.

Second Embodiment

Now, a second embodiment of the present disclosure will be described below with reference to FIG. 7. The second embodiment differs from the first embodiment described above in that a first antenna 59A is configured as an inverted-F antenna.

Note that, in the second embodiment, the same or similar components as or to those of the first embodiment will be given the same reference numerals and detailed description will be omitted or simplified.

Figure 7:
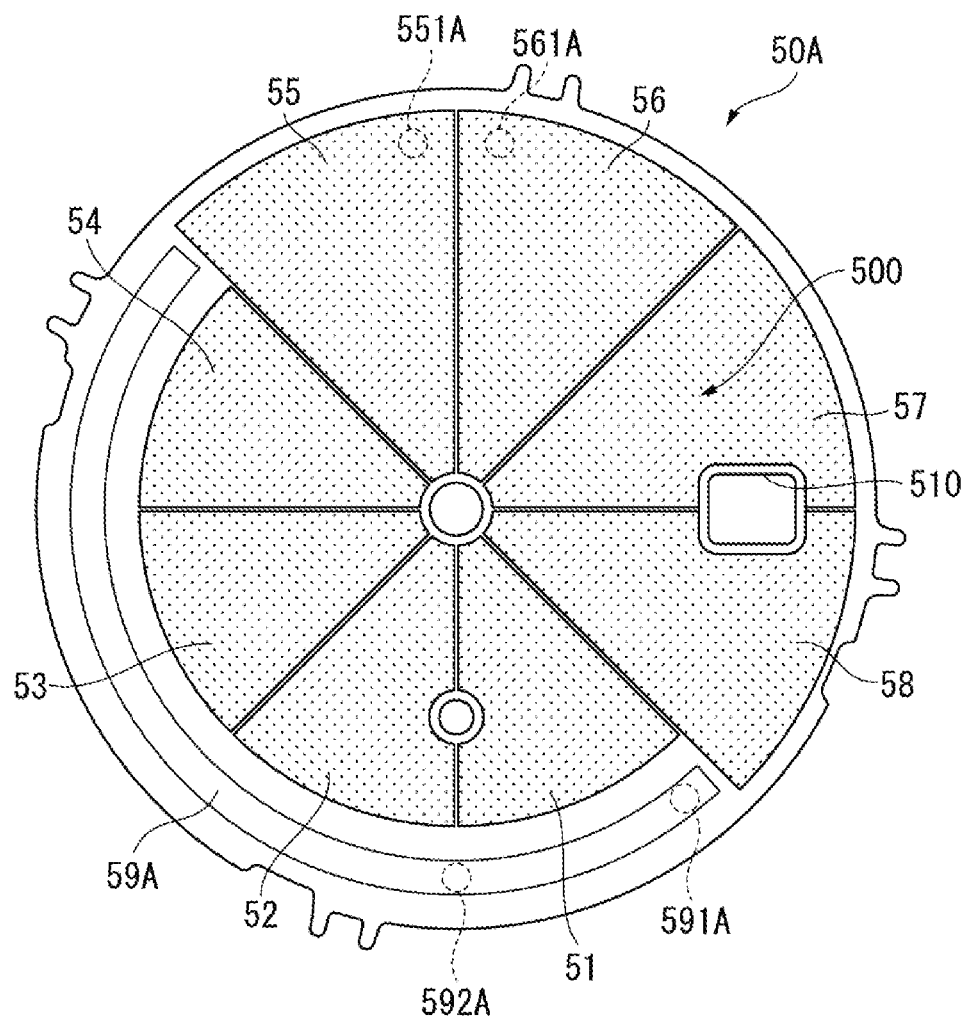
FIG. 7 is a plan view schematically illustrating a solar cell in a watch according to a second embodiment.

FIG. 7 is a plan view schematically illustrating a solar cell 50A.

As illustrated in FIG. 7, the solar cell 50A includes the first antenna 59A.

The first antenna 59A is formed into an arched band shape and is provided with antenna connection terminals 591A, 592A. In other words, in the present embodiment, the first antenna 59A is provided with two connection terminals.

The antenna connection terminal 591A is connected to a ground terminal of the printed wired board 120 via an antenna conduction spring (not shown). The antenna connection terminal 592A is connected to a feed terminal of the printed wired board 120 via an antenna conduction spring (not shown). With this configuration, one of the antenna conduction springs functions as a short-circuit line and the other functions as a power supplying line, to thereby configure the first antenna 59A as an inverted-F antenna.

In the present embodiment, the solar cells 55, 56 are provided with solar cell connection terminals 551A and 561A, respectively. In other words, the solar cell connection terminals 551A and 561A are provided on opposite sides to the antenna connection terminals 591A, 592A sandwiching the center of the solar cell 50A. With this configuration, the solar cell conduction springs 271, 272 connected to the solar cell connection terminals 551A, 561A and the antenna conduction springs connected to the antenna connection terminals 591A, 592A are disposed separated from each other.

Note that in the present embodiment, one of the solar cell connection terminals 551A, 561A and the antenna connection terminal 591A have a ground potential. Thus, the configuration is not limited to that described above, and, for example, the antenna connection terminal 591A and one of the solar cell connection terminals 551A, 561A serving as the ground potential may be shared. An antenna conduction spring/solar cell conduction spring may be disposed between the common connection terminal and the ground terminal of the printed wired board 120.

Advantageous Effects of Second Embodiment

According to the present embodiment, the following advantageous effects can be produced.

In the present embodiment, impedance can be adjusted more easily because the first antenna 59A is configured as an inverted-F antenna. Specifically, it is possible to match impedance with the reception device 40 by adjusting the position of the antenna connection terminal 592A. Thus, a matching circuit such as that in the first embodiment described above does not need to be provided between the first antenna 59A and the reception device 40, and the circuit configuration of the control device 100 can be simplified.

In the present embodiment, the solar cell conduction springs 271, 272 connected to the solar cell connection terminals 551A, 561A and the antenna conduction springs connected to the antenna connection terminals 591A, 592A are disposed separated from each other. Thus, current flowing in the antenna conduction springs as a result of receiving radio waves can be prevented from flowing into the solar cell conduction springs 271, 272 and impairing reception sensitivity.

Further, force applied to the solar cell 50A due to the solar cell conduction springs 271, 272 and the antenna conduction springs can be distributed. As a result, it is possible to prevent the solar cell 50A from warping because the biasing force generated by the solar cell conductive springs 271, 272 and the antenna conductive springs acts in an uneven manner.

Third Embodiment

A third embodiment of the present disclosure is described below with reference to FIGS. 8 and 9. The third embodiment differs from the first and second embodiments described above in that a first antenna 59B is configured as a loop antenna for NFC. Note that NFC is an abbreviation of "near field communication".

Note that, in the third embodiment, the same or similar components as or to those of the second embodiment will be given the same reference numerals and detailed description will be omitted or simplified.

Figure 8:
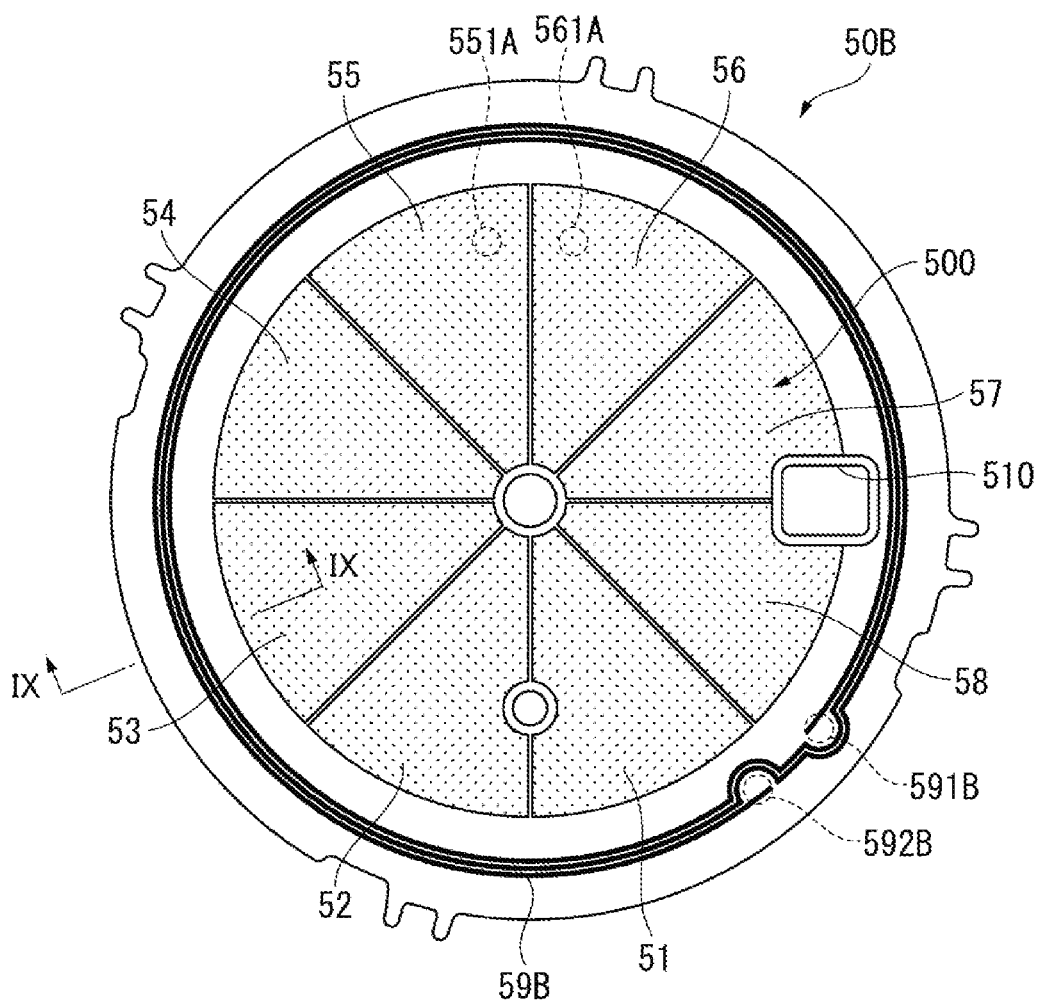
FIG. 8 is a plan view schematically illustrating a solar cell in a watch according to a third embodiment.
Figure 9:
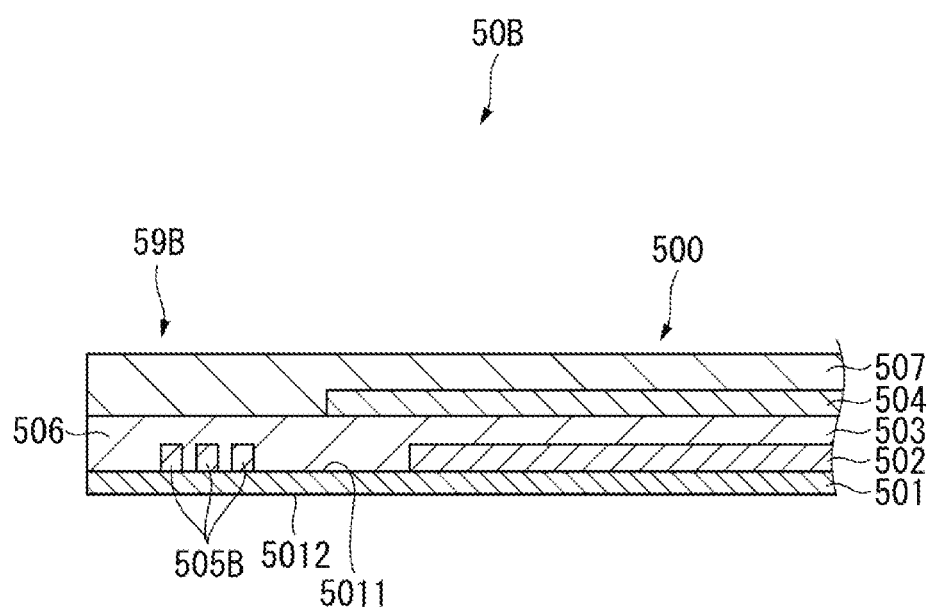
FIG. 9 is a cross-sectional view schematically illustrating the solar cell in the watch according to the third embodiment.

FIG. 8 is a plan view schematically illustrating a solar cell 50B, and FIG. 9 is a cross-sectional view taken along the line IX-IX in FIG. 8.

As illustrated in FIGS. 8 and 9, the solar cell 50B includes the first antenna 59B.

Antenna connection terminals 591B, 592B are provided on both end portions of the first antenna 59B. A third electrode 505B constituting the first antenna 59B is formed into a spiral shape along the outer circumference of the solar cells 51 to 58. In the present embodiment, the third electrode 505B is three times the outer circumference of the solar cells 51 to 58. As a result, the first antenna 59B is configured as a loop antenna for NFC.

Typically, in NFC, radio waves at a frequency of 13.56 MHz are used, and electromagnetic induction changes the magnetic field in the third electrode 505B to generate a current in the third electrode 505B and establish near field communication.

Advantageous Effects of Third Embodiment

According to the present embodiment, the following advantageous effects can be produced.

In the present embodiment, the first antenna 59B is configured as a loop antenna for NFC. Thus, the watch 1 can easily communicate with a smart phone or similar device with NFC functionality.

Fourth Embodiment

A fourth embodiment of the present disclosure is described below with reference to FIGS. 10 and 11. The fourth embodiment differs from the first to third embodiments described above in that a first antenna 59C is configured as a dipole antenna for GPS.

Note that, in the fourth embodiment, the same or similar components as or to those of the first to third embodiments will be given the same reference numerals and detailed description will be omitted or simplified.

Figure 10:
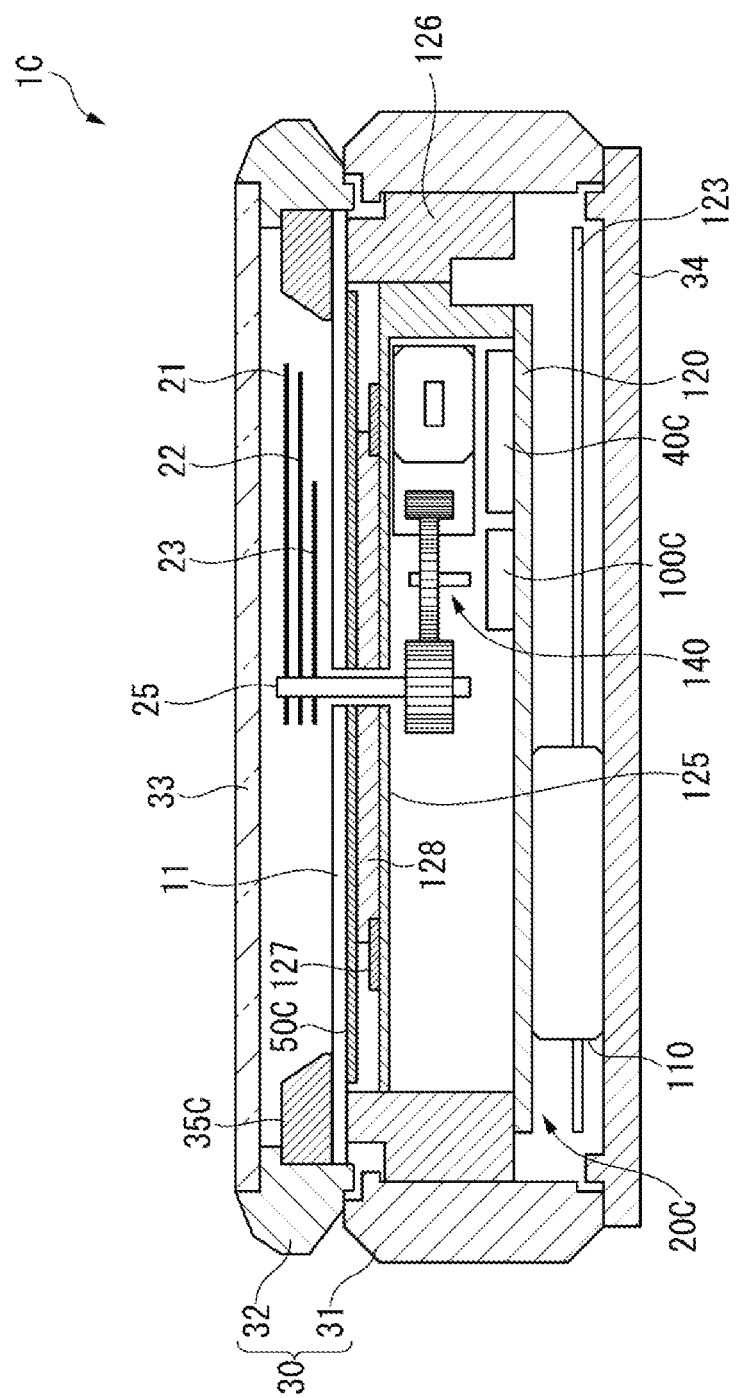
FIG. 10 is a cross-sectional view schematically illustrating a watch according to a fourth embodiment.

FIG. 10 is a cross-sectional view schematically illustrating a watch 1C according to the present embodiment.

As illustrated in FIG. 10, the watch 1C includes a movement 20C.

The movement 20C includes a control device 100C and a reception device 40C on a front side of the printed wired board 120.

The reception device 40C is configured to receive satellite signals transmitted from a GPS satellite via the first antenna 59C to be described below. Then, the reception device 40C processes the received satellite signals to acquire GPS time information and location information. Although not illustrated, the reception device 40 includes, similar to a typical GPS device, an RF unit that receives satellite signals transmitted from a GPS satellite and converts those signals to digital signals, a baseband unit that performs correlation determination on the received signals and demodulates a navigation message, and an information acquisition unit that acquires and outputs GPS time information and location information from the navigation message demodulated by the baseband unit. Note that RF is an abbreviation of "radio frequency".

Figure 11:
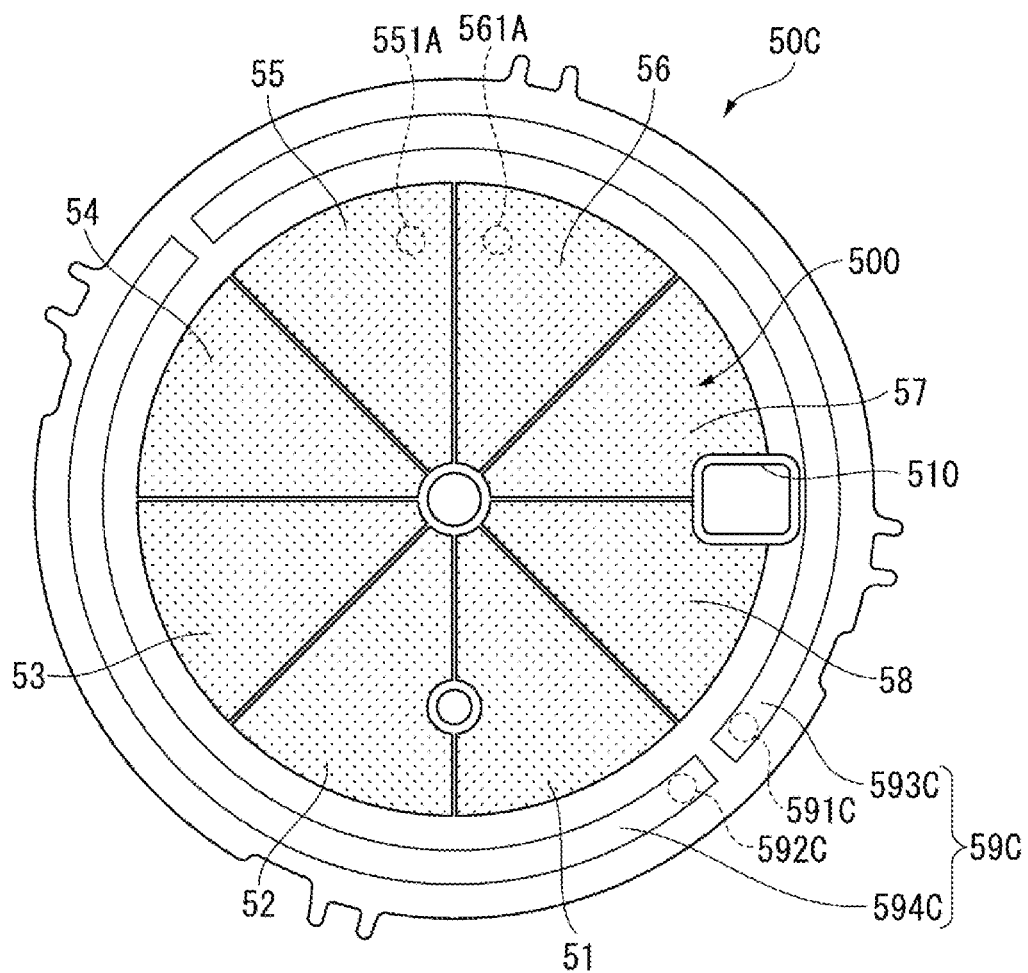
FIG. 11 is a plan view schematically illustrating a solar cell in the watch according to the fourth embodiment.

FIG. 11 is a plan view schematically illustrating a solar cell 50C.

As illustrated in FIG. 11, the solar cell 50C includes the first antenna 59C.

The first antenna 59C includes a first antenna line 593C and a second antenna line 594C. An antenna connection terminal 591C is provided at an end portion of the first antenna line 593C, and an antenna connection terminal 592C is provided at an end portion of the second antenna line 594C. With this configuration, the first antenna line 593C and the second antenna line 594C are electrically connected to each other via the antenna connection terminals 591C, 592C, antenna conduction springs (not shown) connected to the antenna connection terminals 591C, 592C, and the printed wired board 120. In other words, the first antenna 59C including the first antenna line 593C and the second antenna line 594C is configured as a dipole antenna.

In the present embodiment, as illustrated in FIG. 10, the solar cell 50C is disposed at a position overlapping with a dial ring 35C in plan view. As illustrated in FIG. 11, the first antenna 59C is disposed near the outer periphery of the solar cell 50C. Thus, the first antenna 59C is disposed at a position overlapping with the dial ring 35C in plan view.

Advantageous Effects of Fourth Embodiment

According to the present embodiment, the following advantageous effects can be produced.

In the present embodiment, the first antenna 590 is disposed at a position overlapping with the dial ring 35C in plan view.

With this configuration, the first antenna 59C is concealed by the dial ring 35C when the dial 11 is viewed from the front. Thus, the portion of the dial 11 corresponding to the first antenna 59C is not visible, and the appearance of the dial 11 can be made uniform. Therefore, appearance and decorative properties can be improved to achieve a more luxurious feel.

In the present embodiment, the dial ring 35C is disposed on the propagation path of the radio waves propagating to the first antenna 59C because the dial ring 35C is disposed at a position overlapping with the first antenna 59C. Because the dial ring 35C is formed from a non-electrically conductive resin, the dial ring 35C functions as a dielectric. Thus, because the radio waves propagating in the first antenna 59C are shortened in wavelength, the first antenna 59C can be made smaller.

Fifth Embodiment

A fifth embodiment of the present disclosure is described below with reference to FIGS. 12 and 13. The fifth embodiment differs from the first to fourth embodiments described above in that, a second antenna 590D is provided in addition to a first antenna 59D, that is, two antennas are provided.

Note that, in the fifth embodiment, the same or similar components as or to those of the first to fourth embodiments will be given the same reference numerals and detailed description will be omitted or simplified.

Figure 12:
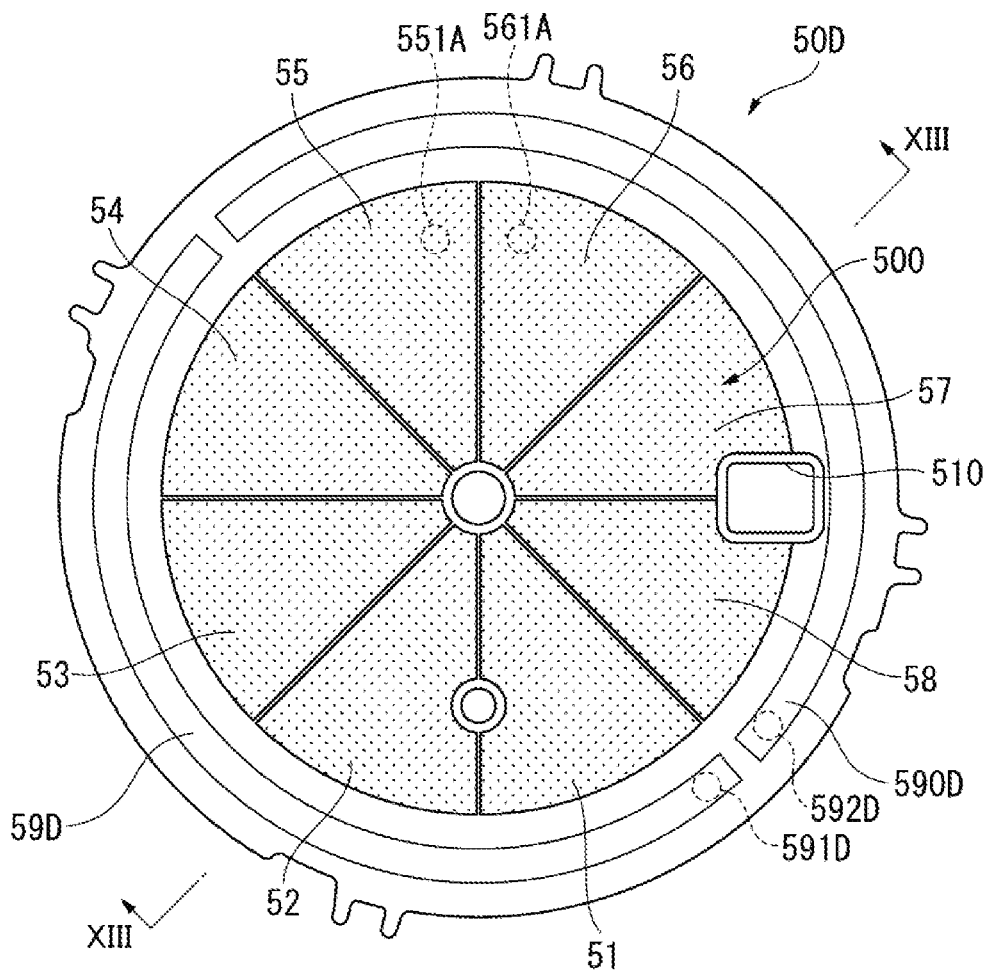
FIG. 12 is a plan view schematically illustrating a solar cell in a watch according to a fifth embodiment.

FIG. 12 is a plan view schematically illustrating a solar cell 50D.

As illustrated in FIG. 12, the solar cell 50D includes the first antenna 59D and the second antenna 590D.

The first antenna 59D is disposed on the outer circumferential side of the solar cells 51 to 54. The first antenna 59D is provided with an antenna connection terminal 591D at an end portion thereof, and is configured as a monopole antenna.

The second antenna 590D is disposed on the outer circumferential side of the solar cells 55 to 58. In other words, the second antenna 590D is disposed at a position not overlapping with the power generating unit watch and the first antenna 59D in plan view. The second antenna 590D is provided with an antenna connection terminal 592D at an end portion thereof, and is configured as a monopole antenna.

Thus, in the present embodiment, the solar cell 50D is provided with two different antennas.

Figure 13:
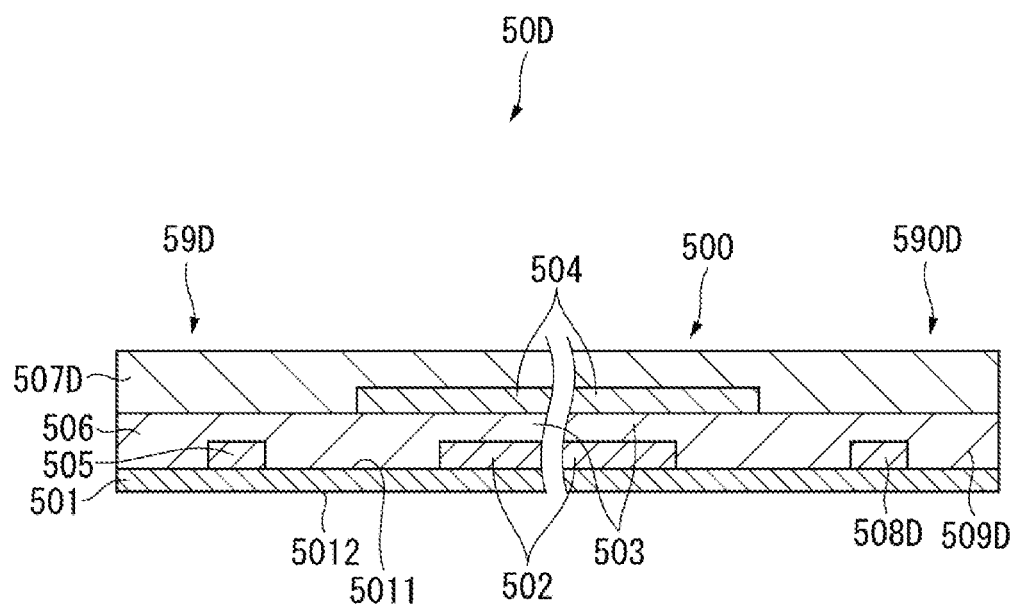
FIG. 13 is a cross-sectional view schematically illustrating the solar cell in the watch according to the fifth embodiment.

FIG. 13 is a cross-sectional view taken along the line A-A in FIG. 12.

As illustrated in FIG. 13, the solar cell 50D includes a fourth electrode 508D, a third semiconductor layer 509D, and a protective layer 507D.

Fourth Electrode

In plan view, the fourth electrode 508D is stacked at the surface 5011 of the substrate 501 at a position not overlapping with the first electrode 502 constituting the power generating unit watch and the third electrode 505 constituting the first antenna 59D.

The fourth electrode 508D is formed of a conductive body containing a metal material such as aluminum or stainless steel. In the present embodiment, the fourth electrode 508D is formed by, for example, sputtering or machining and is disposed at a position overlapping with the first electrode 502 and the third electrode 505 in side view.

Further, the fourth electrode 508D is selectively formed at a position corresponding to the second antenna 590D. With this configuration, the fourth electrode 508D constitutes the second antenna 590D.

Third Semiconductor Layer

The third semiconductor layer 509D is disposed between the fourth electrode 508D and the protective layer 507D. The third semiconductor layer 509D is formed so that a p-type semiconductor and a n-type semiconductor sandwich an i type semiconductor, similar to the first semiconductor layer 503 and the second semiconductor layer 506. In the present embodiment, the third semiconductor layer 509D is integrally formed with the first semiconductor layer 503 and the second semiconductor layer 506.

Note that in the present embodiment, a third antenna may be provided at a position not overlapping with the power generating unit watch, the first antenna 59D, and the second antenna 590D in plan view. That is, the present disclosure also includes a case where three or more antennas are provided in the solar cell 50D.

The first antenna 59D and the second antenna 590D are not limited to being configured as a monopole antenna, and may be configured as, for example, an inverted-F antenna. Further, the first antenna 59D and the second antenna 590D may be configured as different types of antennas.

Protective Layer

Similar to the first to fourth embodiments described above, the protective layer 507D is formed of a non-conductive resin having good strength. In the present embodiment, the protective layer 507D is stacked on the second electrode 504, the second semiconductor layer 506, and the third semiconductor layer 509D. In other words, the protective layer 507D is disposed covering the power generating unit watch, the first antenna 59D, and the second antenna 590D. With this configuration, the power generating unit watch, the first antenna 59D, and the second antenna 590D are protected by the protective layer 507D.

Advantageous Effects of Fifth Embodiment

According to the present embodiment, the following advantageous effects can be produced.

In the present embodiment, the solar cell 50D includes the second antenna 590D having the fourth electrode 508D disposed at a position not overlapping with the power generating unit watch and the first antenna 59D in plan view. In other words, the solar cell 50D is provided with two different antennas.

Thus, by configuring one of the first antenna 59D and the second antenna 590D as an antenna for near field communication and the other as an antenna for GPS, for example, it is possible to achieve a configuration where near field communication is possible while receiving satellite signals.

Sixth Embodiment

A sixth embodiment of the present disclosure is described below with reference to FIG. 14. The sixth embodiment differs from the first to fifth embodiments described above in that the watch 1 is configured as a digital electronic watch.

Note that, in the second embodiment, the same or similar components as or to those of the first to fifth embodiments will be given the same reference numerals and detailed description will be omitted or simplified.

Figure 14:
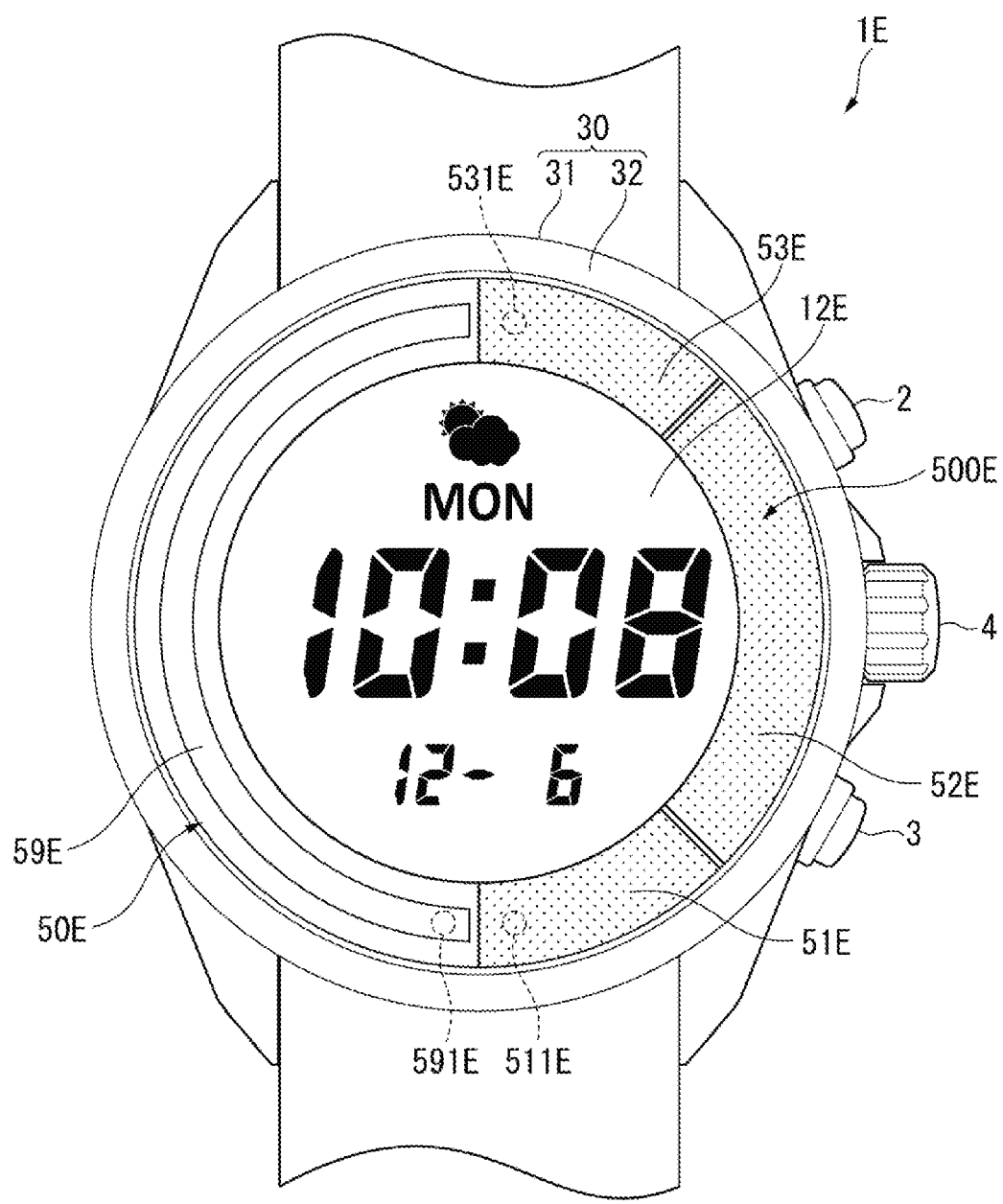
FIG. 14 is a front view schematically illustrating a watch according to a sixth embodiment.

FIG. 14 is a front view schematically illustrating a watch 1E.

As illustrated in FIG. 14, the watch 1E includes a digital display unit 12E and a solar cell 50E.

The digital display unit 12E is made up of, for example, a liquid crystal display, an EPD, an organic EL display, and other components. Note that EPD is an abbreviation of "electrophoretic display", and EL is an abbreviation of "electro luminescence".

The digital display unit 12E is configured to display a weather forecast or other information in addition to the time, the date, the day of the week, and the like by communicating with, for example, an external server. In other words, the watch 1E according to the present embodiment is configured as a so-called smart watch.

The solar cell 50E is formed into an annular shape so as to surround the periphery of the digital display unit 12E, and includes three solar cells 51E to 53E and a first antenna 59E.

The solar cells 51E to 53E are formed in a band-like shape curved along the outer circumference of the digital display unit 12E. The solar cells 51E to 53E are disposed around approximately half the circumference of the solar cell 50E formed into an annular shape.

Further, the solar cells 51E to 53E are connected to each other through a connecting portion (not shown). Thus, the solar cells 51E to 53E are connected in series. Solar cell connection terminals 511E, 531 E are provided in the solar cells 51E, 53E, respectively, located at the end of the electrical connection. Note that the solar cells 51E to 53E constitute a power generating unit watchE according to the present disclosure.

The first antenna 59E is formed in an arched band shape and is disposed around approximately half the circumference of the solar cell 50E formed into an annular shape. An antenna connection terminal 591E is provided at one end of the first antenna 59E. With this configuration, the first antenna 59E is configured as a monopole antenna, similar to the first embodiment described above.

Note that the first antenna 59E is not limited to the configuration described above, and may be configured as, for example, an inverted-F antenna or a dipole antenna.

Advantageous Effects of Sixth Embodiment

According to the present embodiment, the following advantageous effects can be produced.

In the present embodiment, the solar cell 50E is disposed around the digital display unit 12E that displays time and other information. The solar cell 50E includes the first antenna 59E and the solar cells 51E to 53E constituting the power generating unit watchE.

With this configuration, the thickness of the watch 1E can be reduced compared to a case where, for example, the antenna is disposed on the rear side of the digital display unit 12E and the solar cell 50E.

MODIFICATION EXAMPLES

Note that the present disclosure is not limited to each of the embodiments described above, and variations, modifications, and the like within the scope in which the object of the present disclosure can be achieved are included in the present disclosure.

Modification Example 1

In the first, second and fourth to sixth embodiments, the first antenna 59, 59A, 59C, 59D, 59E is formed in an arched band shape and, in the third embodiment, the first antenna 59B is formed in a spiral shape, but the present disclosure is not limited to these embodiments.

Figure 15:
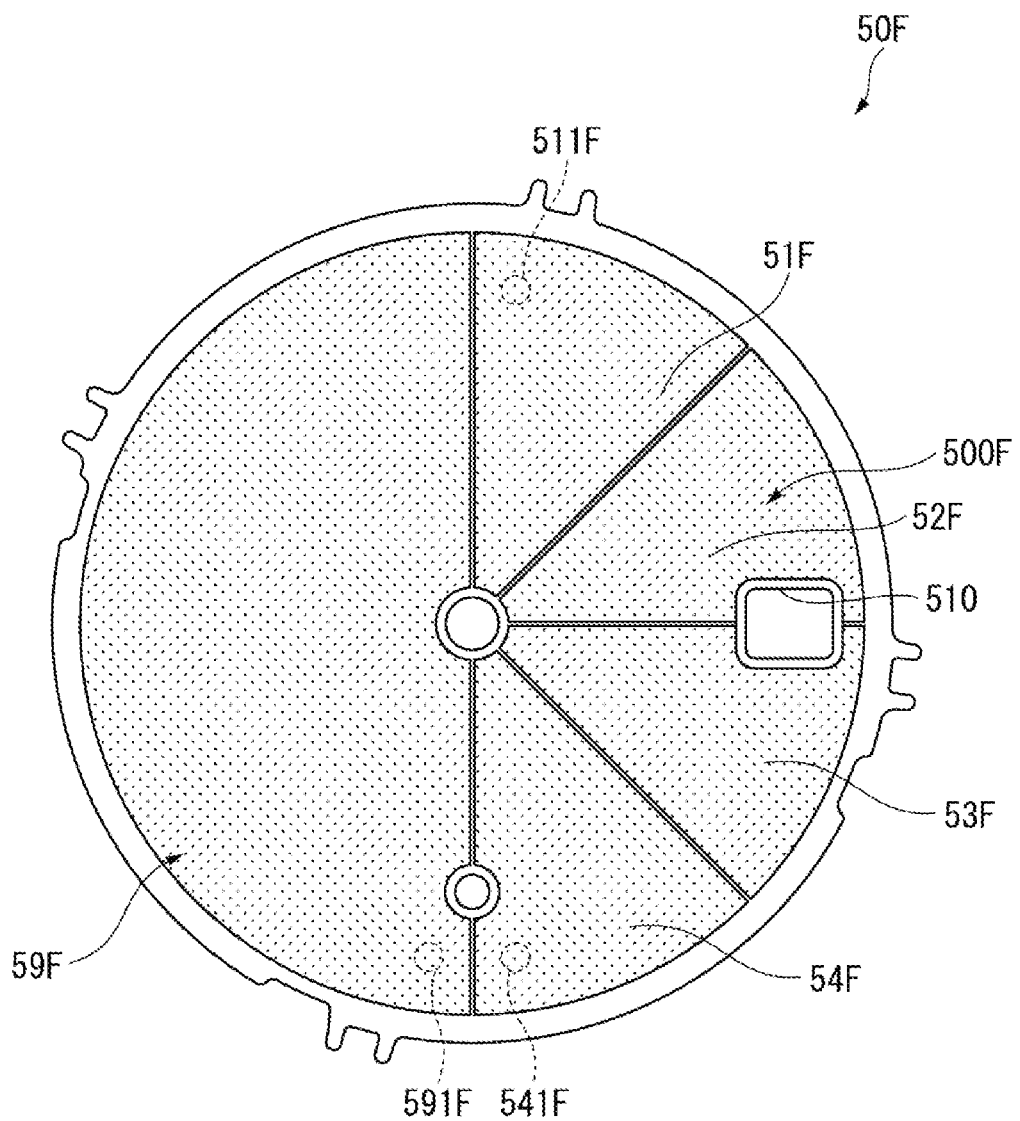
FIG. 15 is a plan view schematically illustrating a solar cell in a watch according to Modification Example 1.

FIG. 15 is a plan view schematically illustrating a solar cell 50F according to Modification Example 1.

As illustrated in FIG. 15, a first antenna 59F may be configured as a semi-circular planar antenna, and an antenna connection terminal 591F may be provided at any location in the semicircle.

In this case, four solar cells 51F to 54F constituting a power generating unit watchF may be provided in the remaining semicircular portion of the solar cell 50F. Then, solar cell connection terminals 511F, 541F may be provided in the solar cells 51F, 54F located at the end of the electrical connection.

Modification Example 2

Figure 16:
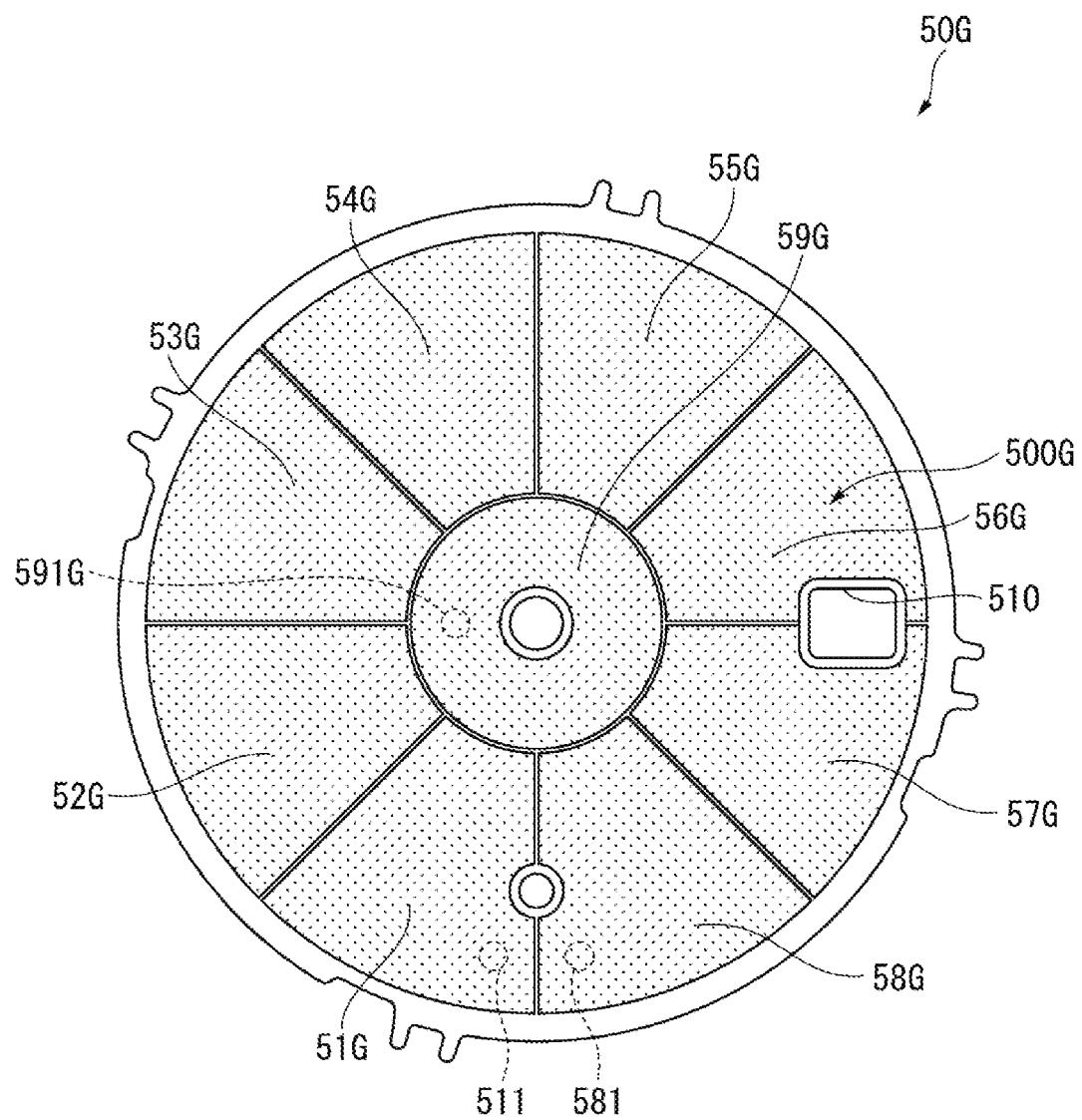
FIG. 16 is a plan view schematically illustrating a solar cell in a watch according to Modification Example 2.

FIG. 16 is a plan view schematically illustrating a solar cell 50G according to Modification Example 2.

As illustrated in FIG. 16, a first antenna 59G may be configured as a circular planar antenna and may be disposed at a central portion of the solar cell 50G, and an antenna connection terminal 591G may be provided at any location in the circular shape.

In this case, eight solar cells 51G to 58G constituting a power generating unit watchG may be disposed so as to surround the outer periphery of the first antenna 59G.

Modification Example 3

Figure 17:
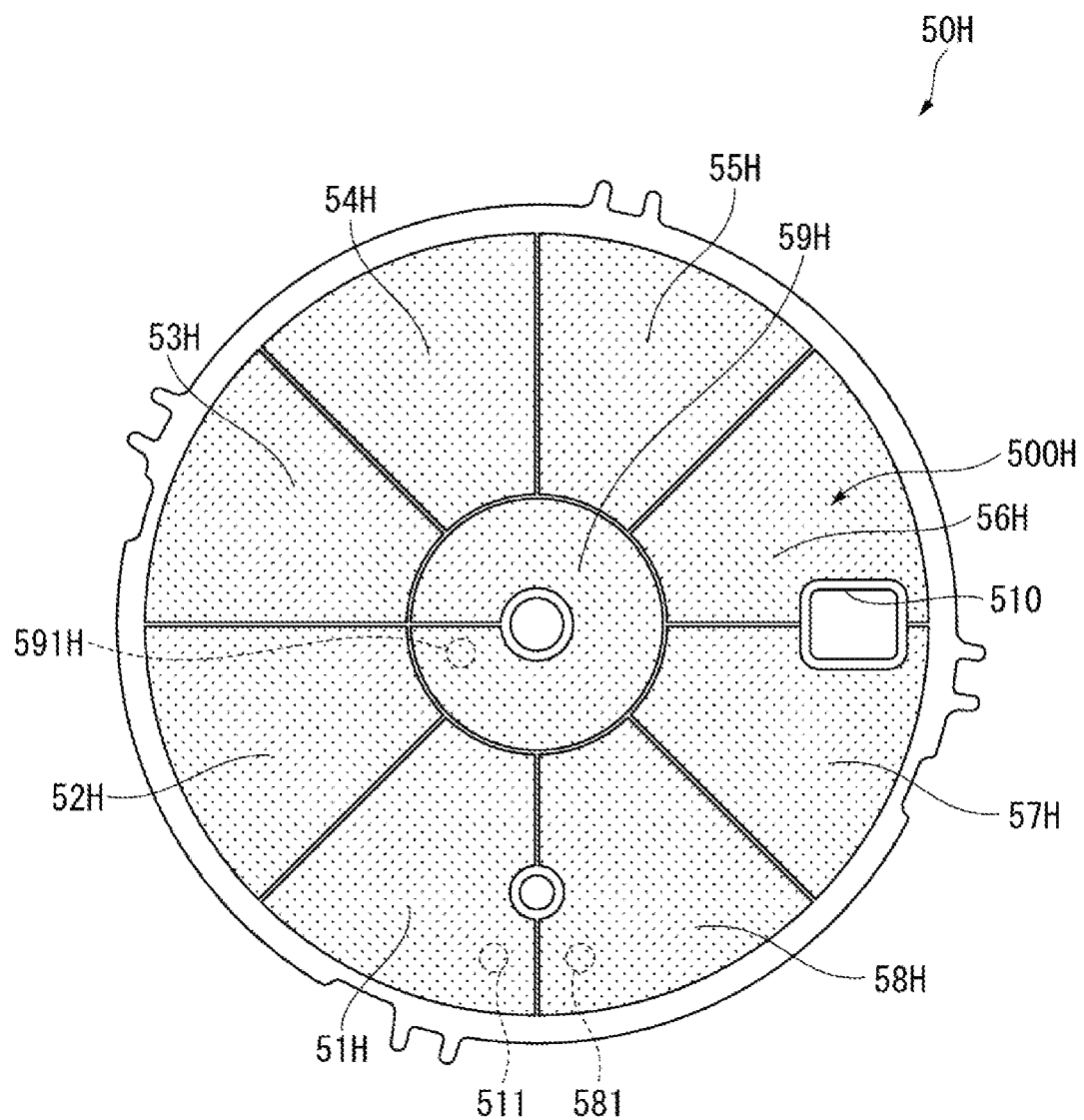
FIG. 17 is a plan view schematically illustrating a solar cell in a watch according to Modification Example 3.

FIG. 17 is a plan view schematically illustrating a solar cell 50H according to Modification Example 3.

As illustrated in FIG. 17, a first antenna 59H may be configured as a C-shaped planar antenna and may be disposed at a central portion of the solar cell 50H, and an antenna connection terminal 591H may be provided at any location in the C-shape.

In this case, eight solar cells 51H to 58H constituting a power generating unit watches may be disposed so as to surround the outer periphery of the first antenna 59H.

Modification Example 4

In the embodiments described above, the second semiconductor layer 506 is disposed between the third electrode 505 and the protective layer 507, but the present disclosure is not limited thereto.

Figure 18:
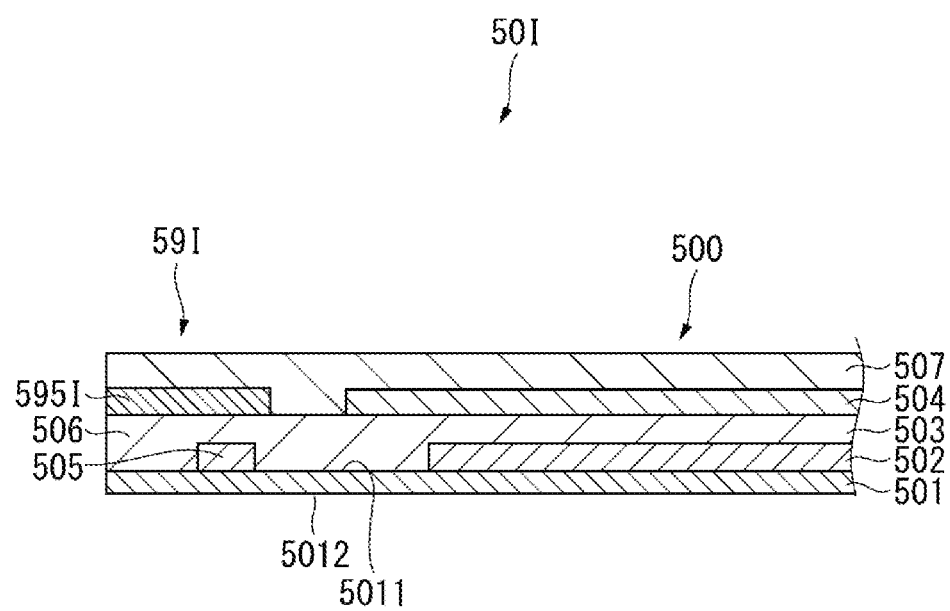
FIG. 18 is a plan view schematically illustrating a solar cell in a watch according to Modification Example 4.

FIG. 18 is a cross-sectional view schematically illustrating a solar cell 50I according to Modification Example 4.

As illustrated in FIG. 18, in a first antenna 59I, a resin layer 595I may be further disposed between the third electrode 505 and the protective layer 507. In other words, the resin layer 595I may be disposed between the second semiconductor layer 506 and the protective layer 507.

Examples of the material of the resin layer 595I include phenolic resins, epoxy resins, polyimide resins, urethane resins, phenoxy resins, nitrocellulose resins, vinyl resins, polyester resins, polyethylene resins, acrylic resins, polyamide resins, and silicone resins. The resin layer 595I is formed by, for example, application or printing.

In this example, the resin layer 595I can be colored by adding a color material such as a pigment, and can be formed to have the same light transmittance as that of the second electrode 504 by adjusting the amount and thickness dimensions of the color material. With this configuration, the rate of light transmittance between the power generating unit watch and the first antenna 59I can be approximated, and hence the difference in color between the power generating unit watch and the first antenna 59I can be further reduced.

Modification Example 5

Figure 19:
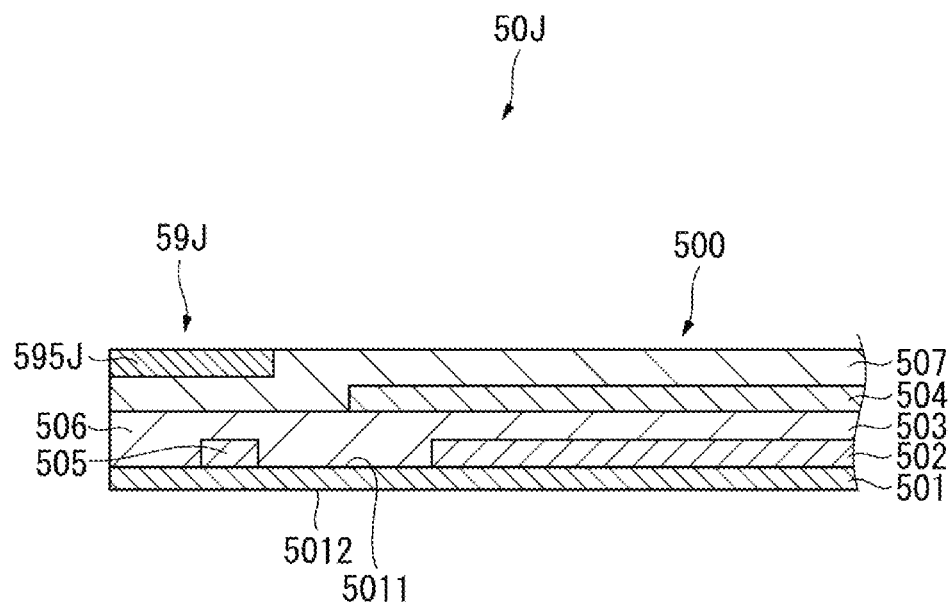
FIG. 19 is a plan view schematically illustrating a solar cell in a watch according to Modification Example 5.

FIG. 19 is a cross-sectional view schematically illustrating a solar cell 50J according to Modification Example 5.

As illustrated in FIG. 19, a resin layer 595J may be laminated to the front side of the protective layer 507. Even with this configuration, the difference in color between the power generating unit watch and a first antenna 59J can be further reduced, similar to the fourth modification described above.

Modification Example 6

The present disclosure also includes a case where the second semiconductor layer 506 is not disposed between the third electrode 505 and the protective layer 507.

In such a configuration, a resin layer such as that described above may be disposed between the third electrode 505 and the protective layer 507, or a case where no resin layer is disposed is also included in the present disclosure.

Modification Example 7

In the embodiments described above, the first electrode 502 and the third electrode 505 are disposed at overlapping positions in side view, but the present disclosure is not limited thereto.

For example, the first electrode 502 and the third electrode 505 may be disposed so as to partially overlap in side view. The present disclosure also includes a case where the first electrode 502 and the third electrode 505 are disposed at position not overlapping in side view.

Modification Example 8

In the embodiments described above, the case 31 and the case back 34 are formed of a metal, but the present disclosure is not limited thereto.

For example, the case 31 and the case back 34 may be formed of a ceramic or a resin.

What is claimed is:
1. A watch comprising:
a case; and
a solar cell disposed inside the case and including:
a substrate made of resin and having a surface;
a power generating unit having, at the surface, a first electrode, a first semiconductor layer, and a second electrode that are stacked in order;
a first antenna including a third electrode, provided at the surface and disposed at a position so as not to overlap the power generating unit; and
a protective layer disposed covering the power generating unit and the first antenna.
2. The watch according to claim 1, wherein the first electrode and the third electrode are disposed to at least partially overlap in a side view viewed in a direction parallel to the surface.
3. The watch according to claim 1, wherein a second semiconductor layer is disposed between the third electrode and the protective layer.
4. The watch according to claim 3, wherein the first semiconductor layer and the second semiconductor layer are provided integrally.
5. The watch according to claim 3, wherein a resin layer is provided between the second semiconductor layer and the protective layer.
6. The watch according to claim 1, comprising:
a dial; and
a dial ring disposed at a periphery of the dial, wherein the third electrode is disposed at a position to overlap the dial ring.

7. The watch according to claim 1, wherein
the solar cell includes a second antenna including a fourth electrode, provided at the surface and disposed at a position so as not to overlap the power generating unit and the third electrode in the plan view; and
the protective layer is disposed covering the power generating unit, the first antenna, and the second antenna.

8. The watch according to claim 1, wherein the first antenna is disposed between the power generating unit and the case in the plan view.

9. The watch according to claim 1, wherein the case includes metal.

* * * * *